United States Patent [19]
Dupart

[11] Patent Number: 6,054,166
[45] Date of Patent: Apr. 25, 2000

[54] PROCESS OF MAKING EXTRUSION COOKED SNACK PRODUCT

[75] Inventor: Pierre Dupart, Winterthur, Switzerland

[73] Assignee: Nestec S.A., Vevey, Switzerland

[21] Appl. No.: 08/708,866

[22] Filed: Sep. 4, 1996

[30] Foreign Application Priority Data

Sep. 28, 1995 [EP] European Pat. Off. .............. 95810609

[51] Int. Cl.$^7$ .................................... A21D 13/00
[52] U.S. Cl. ............................ 426/549; 426/94; 426/439; 426/440; 426/516; 426/618; 426/621; 426/808
[58] Field of Search ...................................... 426/549, 808, 426/560, 618, 621, 457, 94, 439, 440, 516

[56] References Cited

U.S. PATENT DOCUMENTS

| | | | |
|---|---|---|---|
| 4,011,038 | 3/1977 | Willemsen | 425/302 R |
| 4,246,293 | 1/1981 | Larson | 426/637 |
| 5,147,675 | 9/1992 | Gage et al. | 426/549 |
| 5,188,859 | 2/1993 | Lodge et al. | 426/560 |
| 5,260,078 | 11/1993 | Spicer | 426/808 |
| 5,262,190 | 11/1993 | Cunningham et al. | 426/549 |
| 5,320,858 | 6/1994 | Fazzolare et al. | 426/549 |
| 5,500,240 | 3/1996 | Addesso et al. | 426/560 |
| 5,505,978 | 4/1996 | Roy et al. | 426/549 |

*Primary Examiner*—Lien Tran
*Attorney, Agent, or Firm*—Pennie & Edmonds LLC

[57] ABSTRACT

Method of manufacturing a snack, in which a starchy-food based mixture is extrusion-cooked, the extrusion being carried out in ambient atmosphere through a slot-shaped orifice, so as to obtain an expanded strip, the thickness of the strip is reduced by laminating and the strip is cut into pieces of various shapes.

20 Claims, No Drawings

PROCESS OF MAKING EXTRUSION COOKED SNACK PRODUCT

TECHNICAL FIELD

The present invention relates to a method of manufacturing a snack by extrusion-cooking of a mixture based on starchy-food meal or flour.

BACKGROUND ART

Various methods for preparing snacks by extrusion-cooking are known.

Accordingly, for example, U.S. Pat. No. 4,246,293 (J. M. Larson) describes a method of preparing a snack based on protein-enriched potato, in which potatoes which have been cut into slices are blanched, they are pre- dried, a protein-rich additive is mixed into them and the mixture is reduced to a puree which is extrusion-cooked to give a sticky strip which is cut into cylinders 1.27 cm in diameter, and these cylinders are passed through a deep-fryer. A product thus obtained has a relatively high fat content.

U.S. Pat. No. 5,262,190 (Cunningham et al.) describes a method of preparing a meat-based snack, in which a mixture comprising at least 5% meat, at least 50% flour and less than 4% fat is prepared, the mixture is extrusion-cooked and an expanded sausage is obtained, which can be dried and flavored, in particular with a taco or cheese flavoring, for example. A product thus obtained has a relatively low fat content, but its texture differs appreciably from that of traditional tortillas, crisps or crackers obtained by passing a piece of pastry based on wheat, potato or corn flour, for example, through a deep-fryer.

SUMMARY OF THE INVENTION

The aim of the present invention is to propose a simple and practical method of manufacture which can allow a reduction in energy consumption, in this instance a method of manufacturing, by extrusion-cooking, a snack which has a texture similar to that of traditional tortillas, crisps or crackers, for example, while at the same time having a relatively low fat content.

To this end, in the method of manufacturing a snack according to the present invention, a mixture is prepared comprising at least one starchy-food meal or flour and, where appropriate, an amount of water added such that it has a water content of about 8–18%, the mixture is extrusion-cooked, the extrusion being carried out at ambient atmosphere through a die having at least one oblong orifice, so as to obtain an expanded strip strip, and this strip is laminated and cut into pieces.

It has been observed, surprisingly, that such a method of extrusion-cooking makes it effectively possible to manufacture a snack with a relatively low fat content, the texture of this snack being so like that of a snack obtained by a traditional method, in which a piece of pastry based on starchy food flour is passed through a deep-fryer, that it is difficult to tell them apart.

Similarly, this method is effectively capable of allowing an appreciable reduction in the energy consumed in evaporation of water, relative to that consumed in a traditional method involving the passage of a pastry having a water content which may be relatively high through a deep-fryer.

DETAILED DESCRIPTION OF THE PREFERRED EMBODIMENTS

In order to carry out the present method, a mixture is thus prepared comprising at least one starchy-food meal or flour and having a water content of about 8–18%, a small amount of water being added to the mixture, if necessary, in order to obtain such a content.

The starchy food can be selected from cereals such as wheat, rye or corn, and from tubers or roots such as potato, cassava or yam, for example.

A mixture is preferably prepared comprising, in parts by weight, 10–98 parts corn meal or flour, 0–88 parts potato flour, 1–3 parts sodium chloride and 0–3 parts sucrose.

A mixture is preferably prepared having a fat content of 8–15%, as a % of solids, this fat being supplied at least partly by the said starchy-food meal or flour, it being possible for another part to be added to the mixture in the form of edible fat or oil such as hydrogenated palm oil, for example.

A flavoring agent and/or a flavor enhancer such as spices, citric acid and/or sodium glutamate, for example, can also be incorporated into the mixture.

The mixture is preferably extrusion-cooked under conditions such that the extrusion-cooked strip is effectively cooked, in other words so that the starchy food material it comprises is sufficiently gelatinized and such that it is not necessary to arrange for a subsequent step of cooking of the snack in order for it to be ready for consumption.

To do this, the mixture can be extrusion-cooked at a pressure of 10–15 MPa at a temperature or 80–200° C., preferably 150–180° C., for 20–60 s, in a twin-screw extruder, for example. The rate of rotation of the extruder screws can be adjusted to 100–400 revolutions per minute (rpm), preferably 150–180 rpm, for example.

The extrusion is preferably performed through a die having at least one outlet orifice in the shape of a slot which is 0.7–3 mm in width and 2–10 cm in length. Such a die can be made in the form of a steel plate pierced with a channel whose outlet orifice, in other words the opening which appears on the external surface of the plate, which emerges into ambient space, is in the shape of such a slot.

The strip is preferably extruded under conditions such that it has a coefficient of expansion of from 2 to 6, that is to say that, on account of the expansion of the extruded strip, its thickness increases from 2 to 6 times relative to the corresponding width of the outlet orifice of the die. The increase in thickness of the extrusion-cooked strip is thus selected as a preferred criterion of its expansion, its width increasing to a lesser and certainly a less significant extent.

The strip can be laminated under the effect of at least one roller exerting a pressure on it such that its thickness is appreciably reduced, so that the texture of the final product is comparable to the texture of a tortilla, a crisp or a cracker prepared traditionally. This effect can be obtained by laminating the expanded strip under a roller or between two rollers exerting on it a pressure of 10–50 kPa so as to reduce its thickness by a factor of 2 to 6, the width of the strip hardly increasing at all during this lamination, for example. The temperature of the rollers during the lamination may be controlled and maintained at 10–40° C., for example.

Lastly, the laminated strip can be cut by stamping into pieces with various shapes, such as triangles, circles or ovals, for example.

The snack thus obtained can have a water content of 5–13%, for example. It can be eaten as it is if its water content is at the lower end of this range.

It is preferably subjected to a post-drying operation, in particular if it has a water content of greater than or equal to about 8%. Such a post-drying operation can be carried out with hot air at 140–160° C. in a fluidized bed or an oven for a few minutes, down to a residual water content of 3–5%, for example.

Provision may be made to enhance the taste and/or flavour of this snack by sprinkling a powdered flavouring on it or by spraying it with a liquid flavouring, for example. It is possible, in particular, to spray it with 2–3% of an oil or an aromatic emulsion capable of imparting a sensation in the mouth which resembles that imparted by a product passed through a deep-fryer, while at the same time arranging matters such that its total fat content does not exceed 15%, for example.

Lastly, an optional final toasting may be provided for, in particular by exposure to infrared radiation, for example.

EXAMPLES

The examples below give illustrations of a few embodiments of the method for preparing a snack according to the present invention. The percentages and parts therein are given by weight.

Example 1

To prepare the mixture to be extruded, the various ingredients of the following powdered composition are placed in the supply hopper of a Clextral extruder of type BC 45, at a rate of 45 kg of powdered composition per hour:

| | |
|---|---|
| yellow corn meal | 50% |
| potato flour | 44.67% |
| sucrose | 2% |
| chili powder | 0.25% |
| sodium chloride | 1.8% |
| sodium glutamate | 0.98% |
| citric acid | 0.3% |

4.2 kg/h of hydrogenated palm oil and 4.7 kg/h of water are added to this powdered composition. The mixture thus formed in the extruder has a water content of 18%.

This mixture is extrusion-cooked by raising its temperature in the extruder to 160° C. at a pressure of 12 MPa, the screws rotating at 180 rpm.

The extrusion is carried out through a die having is a slot-shaped orifice 0.9 mm in width and 4 cm in length.

The expanded extruded strip obtained is 4 mm in thickness and 55 mm in width. Its water content is 8.5%.

The strip is laminated between two rollers whose surface temperature is maintained at 30° C. and which exert on it a pressure of 30 kPa. Its thickness is thus reduced to 1.5 mm.

The laminated strip is cut by stamping into elliptical pieces 55 mm in length.

These pieces are post-dried in a fluidized bed at 150° C. for a few minutes, down to a residual water content of 3%.

The snack thus obtained has a fat content of 9.45% and a densely bubbled texture very similar to that of a crisp prepared traditionally by passing potato pastry through a deep-fryer.

Example 2

To prepare the mixture to be extruded, the various ingredients of the following powdered composition are placed in the supply hopper of a Clextral extruder of type BC 72, at a rate of 150 kg of powdered composition per hour:

| | |
|---|---|
| yellow corn meal | 94.52% |
| sucrose | 2% |
| chili powder | 0.5% |
| sodium chloride | 2% |
| sodium glutamate | 0.98% |

13.8 kg/h of hydrogenated palm oil and 14.1 kg/h of water are added to this powdered composition. The mixture thus formed in the extruder has a water content of 17%.

This mixture is extrusion-cooked by raising its temperature in the extruder to 164° C. at a pressure of 11.3 MPa, the screws rotating at 150 rpm.

The extrusion is carried out through a die having a slot-shaped orifice 1.2 mm in width and 4 cm in length.

The expanded extruded strip obtained is 5.5 mm in thickness and 60 mm in width. Its water content is 9%.

The strip is laminated between two rollers whose surface temperature is maintained at 30° C. and which exert on it a pressure of 30 kPa. Its thickness is thus reduced to 1.8 mm.

The laminated strip is cut by stamping into isosceles-triangle-shaped pieces 60 mm in height.

These pieces are post-dried in a fluidized bed at 150° C. for a few minutes, down to a residual water content of 3.5%.

The snack thus obtained has a fat content of 9.5% and a densely bubbled texture very similar to that of a tortilla prepared traditionally by passing corn pastry through a deep-fryer.

Comparative Example i

A potato puree or pastry having a water content of 50% is prepared. It is reduced to a thickness of 2 mm and cut into discs 4 cm in diameter by stamping.

These discs are immersed in a deep-fryer, in this case in olive oil at 200° C., for 2 minutes.

Crisps having a densely bubbled texture similar to that of the snack according to Example 1, but whose fat content is 32%, are obtained.

Comparative Example ii

A corn flour pastry having a water content of 30% is prepared. It is reduced to a thickness of 2 mm and cut into discs 4 cm in diameter by stamping.

These discs are immersed in a deep-fryer, in this case in olive oil at 200° C., for 2 minutes.

Tortillas having a densely bubbled texture similar to that of the snack according to Example 2, but whose fat content is 27%, are obtained.

I claim:

1. A method for manufacturing a snack, which consists essentially of preparing a mixture containing at least one starchy food meal or flour and an amount of water to provide a water content of 8–18%, extrusion cooking the mixture at a sufficient time and temperature to gelatinize the starchy food meal or flour before extruding the mixture at ambient atmospheric pressure through a die having at least one oblong orifice, so as to expand the cooked mixture and obtain an expanded strip, and then laminating and cutting this strip into pieces to form the snack; wherein the starchy food meal or flour is sufficiently gelatinized during the extrusion cooking step so that further cooking is not necessary and the snack has a final texture which is comparable to a conventionally prepared tortilla, crisp or cracker.

2. Method according to claim 1, in which a mixture is prepared further consisting essentially of, in parts by weight, 10–98 parts corn meal or flour, 0–88 parts potato flour, 1–parts sodium chloride and 0–3 parts sucrose.

3. Method according to claim 1, in which a mixture is prepared having a fat content of 8–15%, as a % of solids.

4. Method according to claim 1, in which the mixture is extrusion-cooked at 10–15 MPa and at 80–200° C. for 20–60 s.

5. Method according to claim 1, in which the oblong orifice is a slot which is 0.7–3 mm in width and 2–10 cm in length, and the strip has a coefficient of expansion of from 2 to 6.

6. Method according to claim 1, in which the strip is laminated under the effect of at least one roller exerting a pressure of 10–50 kPa on it so as to reduce its thickness by a factor of 2 to 6.

7. Method according to claim 1, in which the laminated strip is cut by stamping into triangular, circular or oval pieces.

8. Method according to claim 1, in which the cut pieces are post-dried to a residual water content of 3–5%.

9. A method for manufacturing a snack, which consists essentially of preparing a mixture containing at least one starchy food meal or flour and an amount of water to provide a water content of 8–18%, extrusion cooking the mixture at a pressure of 10 to 15 MPa and at a temperature of 80 to 200° C. for a time of 20 to 60 seconds to gelatinize the starchy food meal or flour before extruding the mixture at ambient atmospheric pressure through a die having at least one oblong orifice, so as to expand the cooked mixture and obtain an expanded strip, and then laminating this strip and cutting it into pieces without further cooking to form the snack and the snack has a final texture which is comparable to a conventionally prepared tortilla, crisp or cracker.

10. Method according to claim 9, in which a mixture is prepared further consisting essentially of, in parts by weight, 10–98 parts corn meal or flour, 0–88 parts potato flour, 1–3 parts sodium chloride and 0–3 parts sucrose.

11. Method according to claim 9, in which a mixture is prepared having a fat content of 8–15%, as a % of solids.

12. Method according to claim 9, in which the orifice is a slot which is 0.7–3 mm in width and 2–10 cm in length, and the strip has a coefficient of expansion of from 2 to 6.

13. Method according to claim 12, in which the strip is laminated to reduce its thickness by a factor of 2 to 6.

14. Method according to claim 9, in which the laminated strip is cut into triangular, circular or oval pieces.

15. Method according to claim 9, in which the cut pieces are post-dried to a residual water content of 3–5%.

16. Method according to claim 9, in which water is added to the mixture to achieve the recited water content of 8–18%.

17. A method for manufacturing a snack, which consists essentially of preparing a mixture containing at least one starchy food meal or flour and an amount of water to provide a water content of 8–18%, extrusion cooking the mixture at a sufficient time and temperature to gelatinize the starchy food meal or flour before extruding the mixture at ambient atmospheric pressure through a die having at least one oblong orifice so as to expand the cooked mixture to increase its thickness by between 2 and 6 times and thus obtain an expanded strip, laminating the expanded strip to reduce its thickness by between 2 to 6 times, and cutting the laminated strip into pieces to form the snack, wherein the starchy food meal or flour is sufficiently gelatinized during the extrusion cooking step so that further cooking is not necessary and the snack has a final texture which is comparable to a conventionally prepared tortilla, crisp or cracker.

18. The method of claim 17 wherein the expanded strip is laminated under the effect of at least one roller at a pressure of between 10–50 KPa.

19. The method of claim 18 wherein the expanded strip is laminated between two rollers with the temperature being maintained between 10 and 40° C.

20. The method of claim 19 wherein the mixture is extrusion cooked at a pressure of 10 to 15 MPa and at a temperature of 80 to 200° C. for a time of 20 to 60 seconds to gelatinize the starchy food meal or flour before extruding.

* * * * *

UNITED STATES PATENT AND TRADEMARK OFFICE
CERTIFICATE OF CORRECTION

PATENT NO. : 6,054,166

DATED : April 25, 2000

INVENTOR(S) : Dupart

It is certified that error appears in the above-identified patent and that said Letters Patent is hereby corrected as shown below:

Col. 5, claim 2, line 4, change "1-parts" to --1-3 parts--.

Signed and Sealed this

Twenty-seventh Day of February, 2001

Attest:

NICHOLAS P. GODICI

Attesting Officer

Acting Director of the United States Patent and Trademark Office

UNITED STATES PATENT AND TRADEMARK OFFICE
Certificate

Patent No. 6,054,166                                                 Patented: April 25, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Pierre Dupart, Winterthur, Switzerland; Jean-Jacques Desjardins, Denges, Switzerland; Ernst Heck, Vufflens La Ville, Switzerland; and Osvaldo Geromini, Valeyres Rances, Switzerland.

Signed and Sealed this Twenty-second Day of April 2003.

*MARIAN C. KNODE*
*Supervisory Patent Examiner*
Art Unit 3653